(12) United States Patent
Huber

(10) Patent No.: US 12,014,533 B2
(45) Date of Patent: Jun. 18, 2024

(54) METHODS AND SYSTEMS FOR REAL OR NEAR REAL-TIME POINT CLOUD MAP DATA CONFIDENCE EVALUATION

(71) Applicant: CARNEGIE MELLON UNIVERSITY, Pittsburgh, PA (US)

(72) Inventor: Steven Huber, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 673 days.

(21) Appl. No.: 17/061,176

(22) Filed: Oct. 1, 2020

(65) Prior Publication Data

US 2021/0025998 A1 Jan. 28, 2021

Related U.S. Application Data

(63) Continuation of application No. PCT/US2019/025360, filed on Apr. 2, 2019.
(Continued)

(51) Int. Cl.
*G01S 17/42* (2006.01)
*G01S 7/497* (2006.01)
(Continued)

(52) U.S. Cl.
CPC ............ *G06V 10/757* (2022.01); *G01S 7/497* (2013.01); *G01S 17/42* (2013.01); *G01S 17/86* (2020.01);
(Continued)

(58) Field of Classification Search
CPC ...... G06V 10/757; G06V 20/10; G06V 20/64; G01S 17/42; G01S 17/86; G01S 17/89;
(Continued)

(56) References Cited

U.S. PATENT DOCUMENTS

| 5,988,862 A | 11/1999 | Kacyra et al. |
| 6,009,188 A | 12/1999 | Cohen et al. |

(Continued)

FOREIGN PATENT DOCUMENTS

| CN | 101187548 A | * | 5/2008 |
| CN | 102508258 A | | 6/2012 |

(Continued)

OTHER PUBLICATIONS

U.S. Appl. No. 17/886,692, filed Aug. 12, 2022, Pending, Zhang, Ji, et al.
(Continued)

*Primary Examiner* — Jeffrey P Aiello
(74) *Attorney, Agent, or Firm* — Meyer, Unkovic & Scott LLP

(57) ABSTRACT

A method includes acquiring with a scanning device a scan frame including a point cloud comprising a first plurality of points and describing a spatial characteristic of an environment, attributing each of the first plurality of points with a spatial confidence metric, discarding a portion of the first plurality of points when the spatial confidence metric of at least one of the first plurality of points is below a predefined threshold value and directing a user of the scanning device to acquire a second point cloud approximately coincident with the discarded portion of the first plurality of points.

29 Claims, 7 Drawing Sheets

Related U.S. Application Data

(60) Provisional application No. 62/651,894, filed on Apr. 3, 2018.

(51) Int. Cl.
*G01S 17/86* (2020.01)
*G01S 17/89* (2020.01)
*G05D 1/00* (2006.01)
*G06V 10/75* (2022.01)
*G06V 20/10* (2022.01)
*G06V 20/64* (2022.01)

(52) U.S. Cl.
CPC ............ *G01S 17/89* (2013.01); *G05D 1/0011* (2013.01); *G05D 1/0212* (2013.01); *G05D 1/024* (2013.01); *G06V 20/10* (2022.01); *G06V 20/64* (2022.01)

(58) Field of Classification Search
CPC .... G01S 7/497; G05D 1/0011; G05D 1/0212; G05D 1/024
USPC ....... 345/419, 420, 589, 427, 619; 356/3.01, 356/5.01; 382/104, 107, 154, 103, 106, 382/153, 195, 260, 275, 285; 700/195, 700/245; 702/190, 152, 167, 150, 155, 702/159, 181, 5, 153, 81, 172, 3, 97
See application file for complete search history.

(56) References Cited

U.S. PATENT DOCUMENTS

| | | | |
|---|---|---|---|
| 6,111,582 A | 8/2000 | Jenkins | |
| D432,930 S | 10/2000 | Sanoner | |
| 6,208,347 B1 | 3/2001 | Migdal et al. | |
| 6,771,840 B1 | 8/2004 | Ioannou et al. | |
| 7,567,731 B2 | 7/2009 | McDowall et al. | |
| 7,752,483 B1 | 7/2010 | Muresan et al. | |
| 8,180,107 B2 | 5/2012 | Broaddus et al. | |
| 8,406,994 B1 | 3/2013 | Pu et al. | |
| 8,676,498 B2 | 3/2014 | Ma et al. | |
| 8,866,848 B2* | 10/2014 | Ishihara | H04N 5/272 348/222.1 |
| 8,909,371 B2* | 12/2014 | Hamm | B25J 9/1676 400/279 |
| 8,996,228 B1 | 3/2015 | Ferguson et al. | |
| 9,031,809 B1 | 5/2015 | Kumar et al. | |
| 9,043,069 B1 | 5/2015 | Burnette et al. | |
| 9,143,413 B1 | 9/2015 | Manku et al. | |
| 9,315,192 B1 | 4/2016 | Zhu et al. | |
| D823,920 S | 7/2018 | Wiegmann | |
| 10,296,828 B2 | 5/2019 | Viswanathan | |
| 10,442,431 B2 | 10/2019 | Chutorash | |
| 10,551,850 B2 | 2/2020 | Panzica et al. | |
| 10,962,370 B2 | 3/2021 | Zhang et al. | |
| 10,989,542 B2 | 4/2021 | Zhang et al. | |
| 11,009,884 B2 | 5/2021 | Huval et al. | |
| 11,194,938 B2 | 12/2021 | Kincart et al. | |
| 11,237,563 B2 | 2/2022 | Javault et al. | |
| 11,398,075 B2 | 7/2022 | Zhang et al. | |
| 2003/0001835 A1 | 1/2003 | Dimsdale et al. | |
| 2003/0107569 A1* | 6/2003 | Endo | G06T 15/205 345/419 |
| 2003/0160785 A1 | 8/2003 | Baumberg | |
| 2005/0168437 A1 | 8/2005 | Carl et al. | |
| 2005/0203930 A1 | 9/2005 | Bukowski et al. | |
| 2005/0286757 A1 | 12/2005 | Zitnick et al. | |
| 2006/0188143 A1 | 8/2006 | Strassenburg-Kleciak | |
| 2007/0097120 A1 | 5/2007 | Wheeler et al. | |
| 2007/0262988 A1 | 11/2007 | Christensen et al. | |
| 2007/0291233 A1 | 12/2007 | Culbertson et al. | |
| 2008/0033645 A1 | 2/2008 | Levinson et al. | |
| 2008/0112610 A1 | 5/2008 | Israelsen et al. | |
| 2008/0243426 A1 | 10/2008 | Lundgren | |
| 2009/0043439 A1 | 2/2009 | Barfoot et al. | |
| 2009/0237297 A1 | 9/2009 | Davis et al. | |
| 2009/0262974 A1 | 10/2009 | Lithopoulos et al. | |
| 2010/0090899 A1 | 4/2010 | Zhao et al. | |
| 2010/0111370 A1 | 5/2010 | Black et al. | |
| 2010/0286905 A1 | 11/2010 | Goncalves et al. | |
| 2011/0134225 A1 | 6/2011 | Saint-Pierre et al. | |
| 2011/0178708 A1 | 7/2011 | Zhang et al. | |
| 2011/0282622 A1 | 11/2011 | Canter | |
| 2011/0300929 A1 | 12/2011 | Tardif et al. | |
| 2011/0301786 A1 | 12/2011 | Allis et al. | |
| 2012/0123615 A1 | 5/2012 | Bourzier | |
| 2013/0085378 A1 | 4/2013 | Wedan et al. | |
| 2013/0135305 A1 | 5/2013 | Bystrov et al. | |
| 2013/0176305 A1 | 7/2013 | Ito et al. | |
| 2013/0181983 A1 | 7/2013 | Kitamura et al. | |
| 2013/0321418 A1 | 12/2013 | Kirk | |
| 2013/0325244 A1 | 12/2013 | Wang et al. | |
| 2014/0043436 A1 | 2/2014 | Bell et al. | |
| 2014/0118343 A1* | 5/2014 | Takami | G06F 16/5866 345/419 |
| 2014/0125768 A1 | 5/2014 | Bell et al. | |
| 2014/0180579 A1 | 6/2014 | Friend et al. | |
| 2014/0180914 A1 | 6/2014 | Abhyanker | |
| 2014/0193040 A1 | 7/2014 | Bronshtein | |
| 2014/0214255 A1 | 7/2014 | Dolgov et al. | |
| 2014/0278570 A1 | 9/2014 | Plummer et al. | |
| 2014/0297092 A1 | 10/2014 | Delp | |
| 2014/0300885 A1 | 10/2014 | Debrunner et al. | |
| 2014/0300886 A1 | 10/2014 | Zogg et al. | |
| 2014/0301633 A1 | 10/2014 | Furukawa et al. | |
| 2014/0316698 A1 | 10/2014 | Roumeliotis et al. | |
| 2014/0333741 A1 | 11/2014 | Nerurkar et al. | |
| 2014/0350836 A1 | 11/2014 | Stettner et al. | |
| 2014/0379256 A1 | 12/2014 | Stipes et al. | |
| 2015/0015602 A1 | 1/2015 | Beaudoin | |
| 2015/0063683 A1 | 3/2015 | Fu | |
| 2015/0063707 A1 | 3/2015 | Fu | |
| 2015/0078621 A1* | 3/2015 | Choi | G06F 3/017 382/103 |
| 2015/0142378 A1 | 5/2015 | Hebert et al. | |
| 2015/0243080 A1 | 8/2015 | Steinbach et al. | |
| 2015/0317832 A1 | 11/2015 | Ebstyne et al. | |
| 2015/0331111 A1 | 11/2015 | Newman et al. | |
| 2015/0350378 A1 | 12/2015 | Hertel et al. | |
| 2016/0070265 A1 | 3/2016 | Liu et al. | |
| 2016/0086336 A1 | 3/2016 | Lin et al. | |
| 2016/0125226 A1 | 5/2016 | Huang | |
| 2016/0140757 A1 | 5/2016 | Voth | |
| 2016/0189348 A1 | 6/2016 | Canter | |
| 2016/0234476 A1 | 8/2016 | Millett | |
| 2016/0266256 A1 | 9/2016 | Allen et al. | |
| 2016/0274589 A1 | 9/2016 | Templeton et al. | |
| 2016/0349746 A1 | 12/2016 | Grau | |
| 2016/0379366 A1* | 12/2016 | Shah | G06T 7/50 345/419 |
| 2017/0116781 A1* | 4/2017 | Babahajiani | G06T 15/506 |
| 2017/0122736 A1 | 5/2017 | Dold et al. | |
| 2017/0123066 A1 | 5/2017 | Coddington et al. | |
| 2017/0186221 A1 | 6/2017 | Khorasani | |
| 2017/0191826 A1 | 7/2017 | Nagori et al. | |
| 2017/0208251 A1 | 7/2017 | Shamir et al. | |
| 2018/0075648 A1 | 3/2018 | Moghadam et al. | |
| 2018/0342080 A1 | 11/2018 | Maddern et al. | |
| 2019/0003836 A1 | 1/2019 | Zhang et al. | |
| 2019/0011921 A1* | 1/2019 | Wang | G05D 1/106 |
| 2019/0052844 A1 | 2/2019 | Droz et al. | |
| 2019/0218773 A1* | 7/2019 | Suwa | G05B 19/041 |
| 2019/0235083 A1 | 8/2019 | Zhang et al. | |
| 2019/0346271 A1 | 11/2019 | Zhang et al. | |
| 2020/0142074 A1 | 5/2020 | Huber et al. | |
| 2020/0217666 A1 | 7/2020 | Zhang et al. | |
| 2020/0233085 A1 | 7/2020 | Zhang et al. | |
| 2020/0349761 A1 | 11/2020 | Zhang et al. | |
| 2020/0400442 A1 | 12/2020 | Huber et al. | |
| 2021/0027477 A1 | 1/2021 | Huber | |

(56) References Cited

U.S. PATENT DOCUMENTS

| | | | |
|---|---|---|---|
| 2021/0293544 A1 | 9/2021 | Zhang et al. | |
| 2021/0293546 A1 | 9/2021 | Zhang et al. | |

FOREIGN PATENT DOCUMENTS

| | | | | |
|---|---|---|---|---|
| CN | 102607526 | A | 7/2012 | |
| CN | 102819863 | A | 12/2012 | |
| CN | 104913763 | A | 9/2015 | |
| CN | 105164494 | A | 12/2015 | |
| CN | 109313024 | A | 2/2019 | |
| DE | 102014019671 | A1 | 6/2016 | |
| EP | 2133662 | B1 | 2/2012 | |
| EP | 3109589 | A1 | 12/2016 | |
| EP | 3427008 | A1 | 1/2019 | |
| EP | 2913796 | B1 | 3/2019 | |
| EP | 3526626 | A1 | 8/2019 | |
| EP | 3574285 | A1 | 12/2019 | |
| EP | 3646058 | A1 | 5/2020 | |
| EP | 3656138 | A1 | 5/2020 | |
| HK | 1261850 | | 1/2020 | |
| JP | H09142236 | A | 6/1997 | |
| JP | 2004348575 | A | 12/2004 | |
| JP | 2006276012 | A | 10/2006 | |
| JP | 2007298332 | A | 11/2007 | |
| JP | 2010175423 | A | 8/2010 | |
| JP | 2010533307 | A | 10/2010 | |
| JP | 2011529569 | A | 12/2011 | |
| JP | 3173419 | U | 1/2012 | |
| JP | 2012063173 | A | 3/2012 | |
| JP | 2012507011 | A | 3/2012 | |
| JP | 2013054660 | A | 3/2013 | |
| JP | 2013093738 | A | 5/2013 | |
| JP | 2013517483 | A | 5/2013 | |
| JP | 2015200615 | A | 11/2015 | |
| JP | 2015210186 | A | 11/2015 | |
| JP | 2016080572 | A | 5/2016 | |
| JP | 2019518222 | A | 6/2019 | |
| JP | 2019532433 | A | 11/2019 | |
| JP | 2020507072 | A | 3/2020 | |
| JP | 6987797 | B2 | 12/2021 | |
| WO | 2010004911 | A1 | 1/2010 | |
| WO | 2014048475 | A1 | 4/2014 | |
| WO | 2014120613 | A1 | 8/2014 | |
| WO | 2014130854 | A1 | 8/2014 | |
| WO | 2015105597 | A2 | 7/2015 | |
| WO | 2017009923 | A1 | 1/2017 | |
| WO | 2017155970 | A1 | 9/2017 | |
| WO | 2018071416 | A1 | 4/2018 | |
| WO | 2018140701 | A1 | 8/2018 | |
| WO | WO-2018140701 | A1 * | 8/2018 | ............. G01C 11/02 |
| WO | 2019006289 | A1 | 1/2019 | |
| WO | 2019018315 | A1 | 1/2019 | |
| WO | 2019099605 | A1 | 5/2019 | |
| WO | 2019165194 | A1 | 8/2019 | |
| WO | 2019178429 | A1 | 9/2019 | |
| WO | 2019195270 | A1 | 10/2019 | |
| WO | 2020009826 | A1 | 1/2020 | |

OTHER PUBLICATIONS

Macher, Helene, "From Point Clouds to Building Information Models: 3D Semi-Automatic Reconstruction of Indoors of Existing Buildings", Oct. 12, 2017, 31 pages.
Wang, Miao, et al., "Incremental Segmentation of Lidar Point Clouds With an Octree-Structured Voxel Space", The Photogrammetric Record, Mar. 2011, pp. 32-57.
18834521.9, "European Application Serial No. 18834521.9, Extended European Search Report dated Apr. 12, 2021", Kaarta, Inc., 9 pages.
Ishii, Masahiro, "A system for acquiring three-dimensional shapes represented by gestures", "Input-Output", Image Labo., vol. 23, No. 3, Image Laboratory, Japan, Japan Industrial Publishing Co., Ltd., vol. 23, 2012, pp. 14-18.
Kim, Bong Keun, "Indoor localization and point cloud generation for builing interior modeling", IEEE RO-MAN, 2013, pp. 186-191.
Mirowski, Piotr, et al., "Depth Camera Slam on a Low-cost WiFi Mapping Robot", Technologies for Practial Rebot Applications (TEPRA), 2012 IEEE International Conference ON, IEEE, Apr. 23, 2012, pp. 1-6.
U.S. Appl. No. 17/188,567, filed Mar. 1, 2021, Pending.
U.S. Appl. No. 17/202,602, filed Mar. 16, 2021, Pending.
"Measurement accuracy of Lidarbased SLAM systems", Sep. 2016, 1-15.
"Safety Efficiency Performance for Near Earth Flight", www.nearearth.aero, 2015, pp. 1-2.
17763885.5, "European Application Serial No. 17763885.5, Extended European Search Report dated Sep. 17, 2019", Kaarta, Inc., 7 pages.
Belfiore, "This Mobile Device Can Map Your Future Home", https://www.bloomberg.com/news/articles/2017-03-09/this-mobile-device-can-map-your-future-home, Mar. 9, 2017, 1-10.
Besl, et al., "A Method for Registration of 3-D Shapes", IEEE Transactions on Pattern Analysis and Machine Intelligence, vol. 14, No. 2, Feb. 1992, pp. 239-256.
Chen, et al., "Object modelling by registration of multiple range images", Image and Vision Computing, vol. 10, iss. 3, Apr. 1992, pp. 145-155.
Lopez, "Combining Object Recognition and Metric Mapping for Spatial Modeling with Mobile Robots", Master's Thesis in Computer Science at the School of Computer Science and Engineering, 2007, pp. 21-23, 44-56.
PCT/US18/40269, "International Application Serial No. PCT/US18/40269, International Preliminary Report on Patentability dated Jan. 9, 2020", Kaarta, Inc., 12 pages.
PCT/US18/40269, "International Application Serial No. PCT/US18/40269, International Search Report and Written Opinion dated Oct. 19, 2018", Kaarta, Inc., 19 Pages.
PCT/US18/40269, "International Application Serial No. PCT/US18/40269, Invitation to Pay Additional Fees and, Where Applicable, Protest Fee dated Aug. 9, 2018", Kaarta, Inc., 2 Pages.
PCT/US18/42346, "International Application Serial No. PCT/US18/42346, International Preliminary Report on Patentability dated Jan. 21, 2020", Kaarta, Inc., 11 pages.
PCT/US18/42346, "International Application Serial No. PCT/US18/42346, International Search Report and Written Opinion dated Oct. 1, 2018", Kaarta, Inc., 13 Pages.
PCT/US18/61186, "International Application Serial No. PCT/US18/61186, International Preliminary Report on Patentability dated May 28, 2020", Kaarta, Inc., 9 pages.
PCT/US18/61186, "International Application Serial No. PCT/US18/61186, International Search Report and Written Opinion dated Mar. 18, 19", Kaarta, Inc., 11 pages.
PCT/US18/61186, "International Application Serial No. PCT/US18/61186, Invitation to Pay Additional Fees and, Where Applicable, Protest Fee dated Jan. 16, 19", Kaarta, Inc., 2 pages.
PCT/US19/22384, "International Application Serial No. PCT/US19/22384, International Search Report and Written Opinion dated Aug. 7, 2019", Kaarta, Inc., 14 pages.
PCT/US2017/021120, "Application Serial No. PCT/US2017/021120, International Search Report and the Written Opinion dated May 31, 2017", 8 pages.
PCT/US2017/021120, "International Application Serial No. PCT/US2017/021120, International Preliminary Report on Patentability and Written Opinion dated Sep. 20, 2018", Kaarta, Inc., 7 Pages.
PCT/US2017/055938, "Application Serial No. PCTUS2017055938, Invitation to Pay Additional Fees dated Nov. 14, 2017", 2 Pages.
PCT/US2017/055938, "International Application Serial No. PCT/US2017/055938, International Preliminary Report on Patentability dated Apr. 25, 2019", Kaarta, Inc., 14.
PCT/US2017/055938, "International Application Serial No. PCT/US2017/055938, International Search Report and Written Opinion dated Feb. 7, 2018", Kaarta, Inc., 17 pages.
PCT/US2018/015403, "International Application Serial No. PCT/US2018/015403, International Preliminary Report on Patentability dated Aug. 8, 2019", Kaarta, Inc., 5 pages.

(56) References Cited

OTHER PUBLICATIONS

PCT/US2018/015403, "International Application Serial No. PCT/US2018/015403, International Search Report and Written Opinion dated Mar. 22, 2018", Kaarta, Inc., 12 Pages.
PCT/US2019/019132, "International Application Serial No. PCT/US2019/019132, International Preliminary Report on Patentability dated Sep. 3, 2020", Kaarta, Inc., 13 pages.
PCT/US2019/019132, "International Application Serial No. PCT/US2019/019132, International Search Report and Written Opinion dated May 14, 2019", Kaarta, Inc., 15 pages.
PCT/US2019/022384, "International Application Serial No. PCT/US2019/022384, Invitation to Pay Additional Fees dated May 20, 2019", Kaarta, Inc., 2 pages.
PCT/US2019/025360, "International Application Serial No. PCT/US2019/025360, International Search Report and Written Opinion dated Jun. 21, 2019", Kaarta, Inc., 7 pages.
PCT/US2019/038688, "International Application Serial No. PCT/US2019/038688, International Search Report and Written Opinion dated Sep. 12, 2019", Kaarta, Inc., 12 pages.
Zhang, et al., "Laser-visual-inertial odometry and mapping with high robustness and low drift", wileyonlinelibrary.com/journal/rob, Nov. 10, 2017, pp. 1242-1264.
Zhang, et al., "Laser-visual-inertial Odometry Enabling Aggressive Motion Estimation and Mapping at High Robustness and Low Drift", sagepub.co.uk/journalsPermissions.nav DOI: 10.1177/ToBeAssigned www.sagepub.com/, Nov. 2017, pp. 1-18.
Zhang, et al., "LOAM: Lidar Odometry and Mapping in Real-time", Robotics: Science and Systems Conference, Jul. 2014, 9 pages.
Zhang, "Online Lidar and Vision based Ego-motion Estimation and Mapping", Feb. 2017, 1-130.
Zhang, "Online Mapping with a Real Earth Contour II", https://www.youtube.com/watch?v=CfsM4-x6feU, Nov. 24, 2015.
Zhang, et al., "Real-time Depth Enhanced Monocular Odometry", 2014 IEEE/RSJ International Conference on Intelligent Robots and Systems (IROS 2014), Chicago, IL, USA., Sep. 14-18, 2014, pp. 4973-4980.
Zhang, et al., "Visual-Lidar Odometry and Mapping: Low-drift, Robust, and Fast", 2015 IEEE International Conference on Robotics and Automation (ICRA), Washington State Convention Center, Seattle, Washington., May 26-30, 2015, pp. 2174-2181.
Zheng, et al., "Non-local Scan Consolidation for 3D Urban Scenes", ACM SIGGRAPH 2010. Retrieved on Jan. 20, 2018., 2010, 9 Pages.
PCT/US2019/022384, "International Application Serial No. PCT/US2019/022384,I International Preliminary Report on Patentability dated Sep. 24, 2020", Kaarta, Inc., 11 pages.
17860192.8, "European Application Serial No. 17860192.8, Extended European Search Report dated Apr. 24, 2020", Kaarta, Inc., 12 pages.
18745179.4, "European Application Serial No. 18745179.4, Extended European Search Report dated Nov. 2, 2020", Kaarta, Inc., 10 pages.
18824609.4, "European Application Serial No. 18824609.4, Extended European Search Report dated Nov. 2, 2020", Kaarta, Inc., 12 pages.
Adler, Benjamin, et al., "Towards Autonomous Airborne Mapping of Urban Environments", Multisensor Fusion and Integration for Intelligent Systems (MFI), 2012 IEEE Conference, 2012, pp. 77-82.
Chen, Chao-I, et al., "Drogue tracking using 3D flash lidar for autonomous aerial refueling", Laser Radar Technology and Applications XVI, 2011, pp. 1-11.
PCT/US2019/025360, "International Application Serial No. PCT/US2019/025360, International Preliminary Report on Patentability dated Oct. 15, 2020", Kaarta, Inc., 6 pages.
PCT/US2019/038688, "International Application Serial No. PCT/US2019/038688, International Preliminary Report on Patentability dated Jan. 14, 2021", Kaarta, Inc., 11 pages.
Wiemann, Thomas, et al., "Automatic Construction of Polygonal Maps From Point Cloud Data", Safety Security and Rescue Robotics (SSRR), 2010 IEEE International Workshop, 2010, pp. 1-6.

\* cited by examiner

302

| | |
|---|---|
| Acquire with a scanning device a scan frame comprising a point cloud comprising a first plurality of points and describing a spatial characteristic of an environment. | 501 |
| Attribute each of the first plurality of points with a spatial confidence metric. | 503 |
| Discard a portion of the first plurality of points when the spatial confidence metric of at least one of the first plurality of points is below a predefined threshold value. | 505 |
| Direct a user of the scanning device to acquire a second point cloud approximately coincident with the discarded portion of the first plurality of points. | 507 |

Fig. 5

601 — Acquire with a scanning device a scan frame comprising a point cloud comprising a first plurality of points and describing a spatial characteristic of an environment.

603 — Determine a location estimate of the scanning device via an operation an inertial measurement unit (IMU) forming a part of the scanning device.

605 — Refine the location estimate via the inclusion of at least one of visual data acquired by the scanning device and laser odometry data acquired by the scanning device wherein each of visual data and odometry data comprises an associated confidence metric.

607 — Utilize the refined location estimate to discard a portion of the plurality of points from inclusion in the map when the confidence metric is below a predefined threshold.

Fig. 6

METHODS AND SYSTEMS FOR REAL OR NEAR REAL-TIME POINT CLOUD MAP DATA CONFIDENCE EVALUATION

STATEMENT OF PRIORITY

This application is a bypass continuation of PCT/US19/25360 entitled "METHODS AND SYSTEMS FOR REAL OR NEAR REAL-TIME POINT CLOUD MAP DATA CONFIDENCE EVALUATION, filed Apr. 2, 2019.

PCT/US19/25360 claims priority to U.S. Provisional Patent Application Ser. No. 62/651,894, entitled "METHODS AND SYSTEMS FOR REAL OR NEAR REAL-TIME POINT CLOUD MAP DATA CONFIDENCE EVALUATION FOR USE WITH ACQUIRED SCAN FRAME DATA," filed on Apr. 3, 2018.

The disclosure of PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, is incorporated herein by reference in its entirety and for all purposes.

BACKGROUND

Field

The methods and systems described herein generally relate to the real or near real-time evaluation of LIDAR obtained map data. More particularly, the methods described herein are directed to the rejection of acquired scan frame data exhibiting a low confidence metric and the subsequent interactive process of guiding a user of a SLAM system to compensate for the rejected data.

Description of the Related Art

There are many applications where an accurate model of a local area is required and common ways of producing these localized models include, but are not limited to, using cameras and LIDAR. These sensors can capture local information within their Field of View (FOV) in one or more scan frames and merge the data obtained therefrom with existing map data.

It is often times the case that newly acquired scan frame data is of a spatial quality insufficient to enable the merging of newly acquired data with an existing map.

In the description that follows, there are described exemplary and non-limiting embodiments of methods for identifying scanned data having an unacceptable spatial confidence metric, rejecting such data and, where appropriate, compensating for the rejected data.

SUMMARY

In accordance with an exemplary and non-limiting embodiment, a method comprises acquiring with a scanning device a scan frame comprising a point cloud comprising a first plurality of points and describing a spatial characteristic of an environment, attributing each of the first plurality of points with a spatial confidence metric, discarding a portion of the first plurality of points when the spatial confidence metric of at least one of the first plurality of points is below a predefined threshold value and directing a user of the scanning device to acquire a second point cloud approximately coincident with the discarded portion of the first plurality of points.

In accordance with an exemplary and non-limiting embodiment, a system comprises a laser scanning device comprising at least one processor adapted to execute software that when executed causes the system to acquire with the scanning device a scan frame comprising a point cloud comprising a first plurality of points and describing a spatial characteristic of an environment, attribute each of the first plurality of points with a spatial confidence metric, discard a portion of the first plurality of points when the spatial confidence metric of at least one of the first plurality of points is below a predefined threshold value and direct a user of the scanning device to acquire a second point cloud approximately coincident with the discarded portion of the first plurality of points.

In accordance with an exemplary and non-limiting embodiment, a method comprises acquiring with a scanning device a scan frame comprising a point cloud comprising a first plurality of points and describing a spatial characteristic of an environment, determining a location estimate of the scanning device via an operation an inertial measurement unit (IMU) forming a part of the scanning device, refining the location estimate via the inclusion of at least one of visual data acquired by the scanning device and laser odometry data acquired by the scanning device wherein each of visual data and odometry data comprises an associated confidence metric and utilizing the refined location estimate to discard a portion of the plurality of points from inclusion in the map when the confidence metric is below a predefined threshold.

In accordance with an exemplary and non-limiting embodiment, a system comprises a laser scanning device comprising at least one processor adapted to execute software that when executed causes the system to acquire with a scanning device a scan frame comprising a point cloud comprising a first plurality of points and describing a spatial characteristic of an environment, determine a location estimate of the scanning device via an operation an inertial measurement unit (IMU) forming a part of the scanning device, refine the location estimate via the inclusion of at least one of visual data acquired by the scanning device and laser odometry data acquired by the scanning device wherein each of visual data and odometry data comprises an associated confidence metric and utilize the refined location estimate to discard a portion of the plurality of points from inclusion in the map when the confidence metric is below a predefined threshold.

BRIEF DESCRIPTION OF THE FIGURES

FIG. 5 is a block diagram of a method in accordance with an exemplary and non-limiting embodiment.

FIG. 6 is a block diagram of a method in accordance with an exemplary and non-limiting embodiment.

DETAILED DESCRIPTION

As described elsewhere in the attachments hereto, point cloud data may be acquired, such as by a simultaneous location and mapping (SLAM) system, to describe the physical characteristics of a three dimensional environment. In some embodiments, use of a SLAM system involves the operation of LIDAR to produce a point cloud comprised of a plurality of point locations in 3D wherein each point represents a location in the three dimensional space of the environment.

In accordance with exemplary and non-limiting embodiments, as new points are received from each successive scan frame, a subset of the prior map is selected and utilized to find potential point matches in order to adjust the entire new scan frame. Specifically, point clouds from one scan frame, which may captured at a rate of, for example, one scan frame per second, may be compared to a prior scan frame. As a result, all of the points captured in one second may be compared to all of the points captured in the next second corresponding to a second scan frame. Typically, some of the newly acquired point data are filtered out based on how clean the data are, how sharply curved the data points are, and various other metrics.

A set of data points may form a descriptor of a surface that may be curved. For example, a series of points can align along a surface which may be curved. If the set of points describe the surface and the curvature is high, then it can be used as a feature that can be tracked.

In accordance with exemplary and non-limiting embodiments, point normal directions and the vector from the point back to the location from which it was observed are utilized, at least in part, to filter potential false positive point matches that are common in situations such as when observing two sides of the same wall.

In some embodiments, as point data from successive scan frames are stored in a map, additional data are recorded to aid in comparing incoming point cloud data to the data already stored in the map. Specifically, additional information may be stored corresponding to either the angle between the sensor and that point where it was observed or the surface normal at that point. As used herein, "surface normal" refers to a local measure of the orientation of the surface that that point lies on top of. As noted above, in accordance with embodiments of methodologies disclosed herein, one may filter out the data that are compared against the existing map using these additional metrics.

Figure 1B:
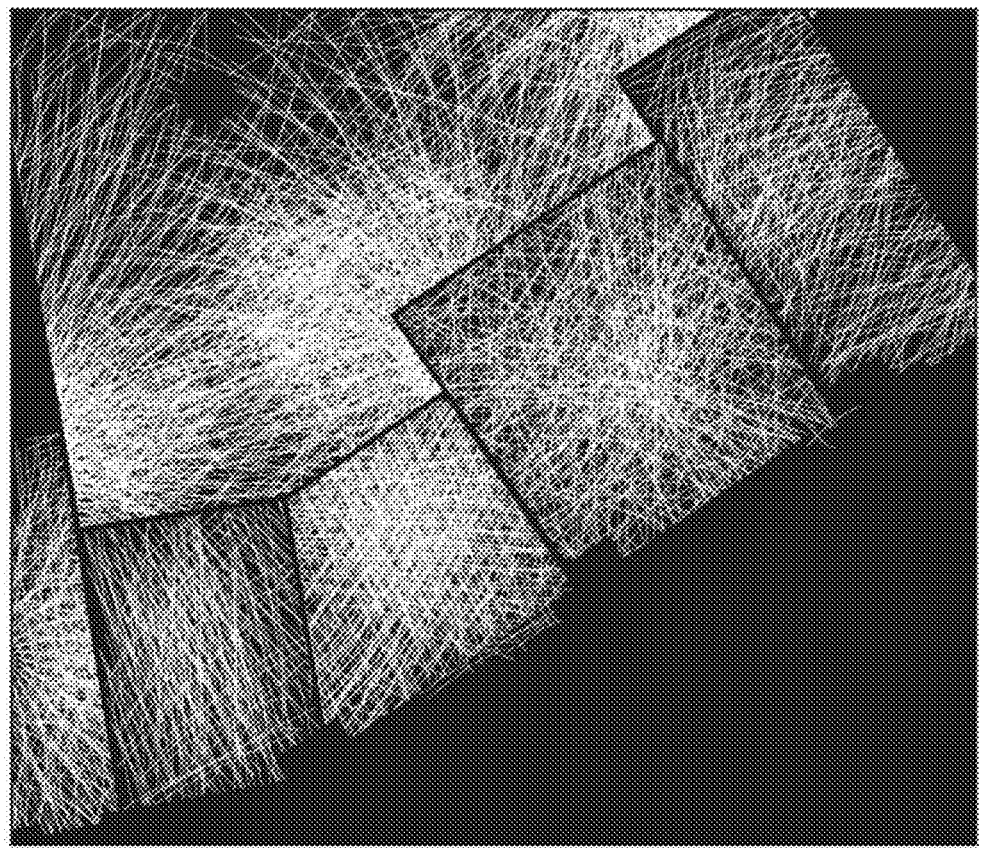
FIGS. 1A-1B illustrate an exemplary and non-limiting embodiment of filtering potential laser matches.
Figure 1A:
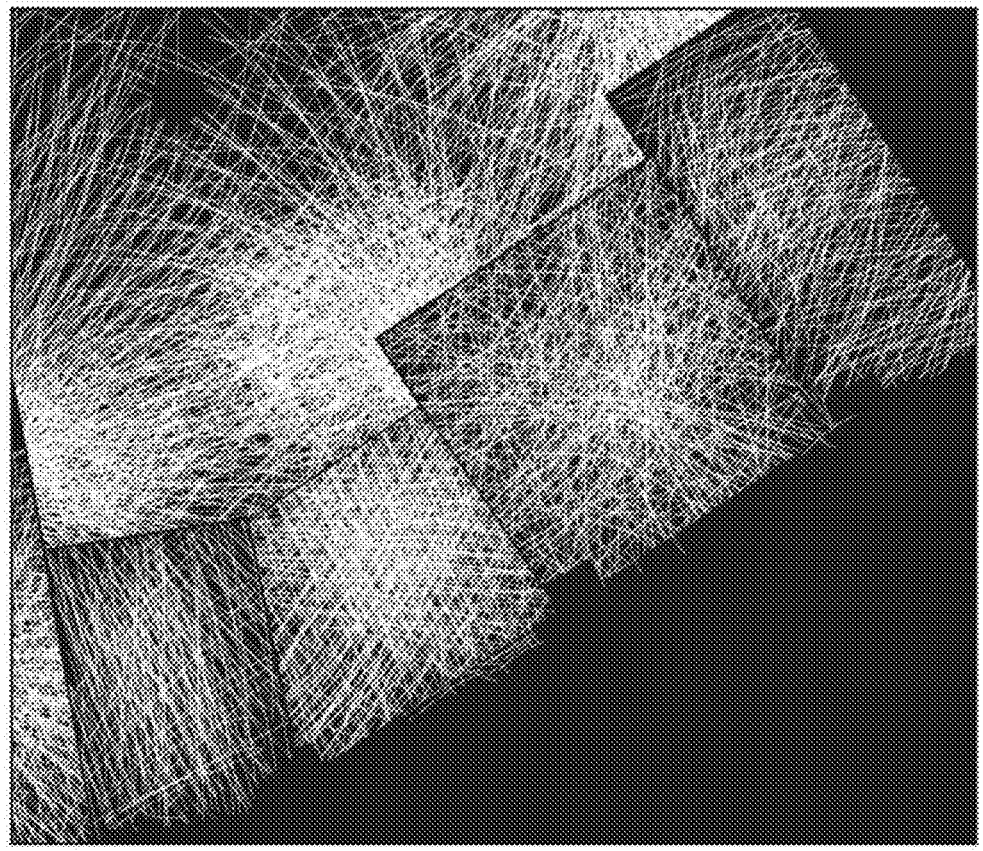

With reference to FIG. 1, there is illustrated an exemplary and non-limiting embodiment of filtering potential laser matches. Specifically, there is illustrated filtering potential laser matches by point normals resulting in improvements in the differentiation of points in different rooms. This can be seen in the improved wall thickness accuracy and the rooms being square and level relative to each other. The two images shown were produced with the same raw sensor data. The map on the left does not filter matches by point cloud normals, while the one on the right better reflects the actual geometry and illustrates the efficacy of such filtering.

Specifically, new points that are received in a scan frame and are measured as corresponding to a wall are matched only to points that are on that wall and not, for example, something sticking out from the wall like a light fixture or a cardboard box sitting on the floor that's close to the wall. For example, consider the instance wherein a box having a generally cubic form abuts a wall along a surface of the box. In this example, four sides of the box extend away from the wall while each extending side abuts the wall along a border of each side. As one moves away from the wall along a side of one such box, points associated with a side are also in close proximity to the wall. In fact, as the box in this example abuts the wall, some points on a surface of the box are coincident with the wall. When one of these points on a surface of the box is considered in isolation and without any additional context or information, it is likely that a point on a surface of the box but near to the wall may be erroneously determined to form a part of the wall. However, in the present example, the point under consideration forms a part of a box side that is generally perpendicular to the orientation of the wall. As a result, one may consider the surface normal of the point and, observing that is at approximately ninety degrees from a normal of the wall surface, one may filter out such a point as matching data from the surface of the wall.

In another example, consider a map that includes data describing a first side of a wall in a first room wherein opposing first and second sides of the wall are observable from different rooms each sharing the wall as a barrier. If one leaves the first room and enters into the second room one may rotate around to scan the second side of the wall. Assuming the wall is relatively thin in terms of thickness, the points received from frame scans corresponding to the second wall will appear to be uniformly close to those of the first side. It is also the case that both the surface normals of each opposing wall side and the direction to the instrument from which each point was acquires are approximately one hundred and eighty (180) degrees out of synch. Therefore, if one filters from the map all points having normal or direction of acquisition vectors with a value greater than a predetermined value, e.g., one hundred and sixty (160) degrees, two advantages arise. First, the possibility of mapping points on the second wall side to the first wall side is eliminated. Second, it is substantially more quickly apparent that the points acquired from the second wall side form a previously unscanned surface.

In the previous example, it is further the case that, as with the box example, it is possible when entering into the second room that a side wall shares a border with, for example, the first wall side. As with the box example, the points of the side wall closest to the first wall side may be difficult to differentiate from the first wall side absent normal or direction acquisition information.

In short, when faced with the problem of considering a lot of points in proximity to each other but which are not easily differentiated from another on the basis of which surfaces they describe, one may ascribe surface normal information or data acquisition direction information to each point and use such information to separate points making the resultant scan or a resultant map much more accurate.

Having discussed the use of surface normals in filtering map data, it is noted that the use of surface normals applied to point data is not without some difficulties. One difficulty with the use of surface normals as described above is that one generally needs to have a lot of data around each point to estimate the local surface and, hence, the normal vector. As a result, if one observes data in a new room, there may not be sufficient local data to inform one where the surface normal is. As a proxy for the surface normal one may use the view direction, which is the angle between the point and the 3D scanner at the moment that it was observed.

For example, consider a scan frame acquired upon entering into a previously unscanned room. In such an instance, the scan frame data is likely to comprise large volumes of sparse or missing data, particularly with regards to a wall that is, for example, ten or fifteen meters away from the scanner. In such an instance, some of the points might be spaced such that there's only one point and the next closest point is, for example, a half of a meter away. As a result, one may not have enough data to estimate the surface normal accurately. However, storing the angle to the sensor (i.e., "data acquisition vector") as a proxy for a surface normal in the present example is of similar utility to a surface normal as described above when entering a previously unscanned room. While the use of proxy data acquisition vectors is not as accurate as the use of computed normal vectors, such data acquisition vector use is often times sufficient to enhance the mapping of point data as described above with reference to normal vectors.

In accordance with exemplary and non-limiting embodiments, as data from subsequent scan frames are added to a map, one may assign a confidence level attribute to each point, to all points of a scan, or preferentially to sub-portions of a scan to indicate the degree of confidence one has in the spatial accuracy of the each point's determined location. Then, when on seeks to match subsequent points from successive scan frames to the map, one may preferentially give priority to map points having a relatively higher confidence level. In one embodiment, when matching a scan frame to an existing map, one may drop from consideration all of the map points having a confidence level below a predefined threshold such as, for example, the bottom 20% of points in terms of location confidence. Using such a threshold helps to avoid the situation wherein a single bad scan comprised of offset point locations having low confidence levels would tend to pull future data points towards the bad data In accordance with an exemplary and non-limiting embodiment, another point metric that may be utilized when filtering map data in order to improve the scan matching of acquired points is the density of the map points utilized to match against. For example, if one observes data in a completely new area of the map that has not been previously scanned as might happen if the scanner is turned around 180 degrees quickly, most of the data in the map around the newly observed points are situated in relatively low density areas.

This fact operates to limit how fine the alignment between the current scan frame and the matched map data can be because of the limited corresponding data in the map. As a result, one may filter so as to use the densest, most well observed portions of the map when performing scan point matching. Specifically, when one performs matching of what points in a current frame match to the map, one considers the local density around the points being matched to obtain a sense of how fine that match is.

If a newly acquired point is, for example, five meters from the closest point in the map built so far then, even if the two points are matched, the precision of the resulting alignment is relatively coarse because there isn't a lot of support on the map. If, however, one has a relatively high data density in the map in the vicinity of a newly observed point, then one going may to be able to figure out where that new point resides much more precisely. One method of defining the desired data density for such filtering involves thresholding how far one looks around new data to find data in the map.

In some embodiments, as one adds newly acquired points to an existing map and adjusts the positioning of each point in the x, y and z directions, one may also accumulate and attribute each point with a metric related to how many points were previously observed within a thresholded distance (e.g., 10 centimeters) from each new point. As a result, the point data comprising the map may be updated either in real or near-real time with an attribute reflecting the average data density used to map each point. In some embodiments, the thresholded data density value may be continuously adapted based on the structure of the existing map.

In accordance with other exemplary and non-limiting embodiments, data may be filtered based, at least in part, upon the distance from the SLAM system scanner to each point at the time that the point is acquired. Consider the following example. One observes a whole scan frame of point cloud data and proceeds to match the newly acquired data to the map. However, it turns out that the scanned data was off by, for example, one degree around some axis. As a result, all of the scanned points were slightly off from their actual positions by a small angular amount. While such a small angular error has a very small effect on the absolute location of points close to the scanner, the real distance offset of such an error can become quite large at large distances from the scanner. As a result, points that are observed very close to the scanner are going to be off by a small amount while far away points may be off by, for example, 30 centimeters or more.

As a result, one may filter the map data so as not to match newly received points that are more than a predetermined threshold away from the scanner.

In yet other exemplary and non-limiting embodiments, one may either extrapolate, interpolate or both between points in map data such as, for example, points forming a generally planar surface. For example, even in an instance where there is relatively sparse coverage on a generally planar wall, one might use such information to identify the wall as a planer surface and impose extra constraints upon the points forming the wall. Then, if a newly acquired point is not near an existing map point but is likely in the same plane as existing points, then the new point may be mapped to a position coplanar with the previously mapped points. In some instances, once a planar surface having sparse data areas is identified, additional points may be added by interpolation, extrapolation, or both, and added to the map. In such an instance, these generated points will likely be near a newly acquired point that maps to the identified wall.

In other exemplary and non-limiting embodiments, one may enforce assumptions upon new frame scans that may enhance accuracy when adding points acquired therefrom to an existing map. By so doing one may make sure, for example, that when walking from room to room making one does not introduce pitch or roll in the new space. For example, once a set of points is determined to represent a generally planar floor, subsequent measurements made after entering an adjoining room maintain the same planar form of the floor. While such an assumption may break down in some cases, it might help in a lot of other cases. In another embodiment, one may also potentially add an assumption that it's likely that there might be two parallel planes with 180 degree opposite normals, as when a wall is scanned from both sides. Using this assumption, one might position the points acquired from a second side of a wall a known distance from the plane corresponding to the first side of a wall based on a known thickness of such walls.

In yet other exemplary and non-limiting embodiments, some of the aforementioned assumptions may be utilized in post-processing of the map data. For example, during post processing one may split up the data into different identified rooms by, for example, manually saving the position that the scanner was at when walking through doorways. Then, one may level the floor of each of those rooms relative to each other and line up the walls relative to each other under the assumption that the walls are parallel and generally perpendicular.

Figure 2B:
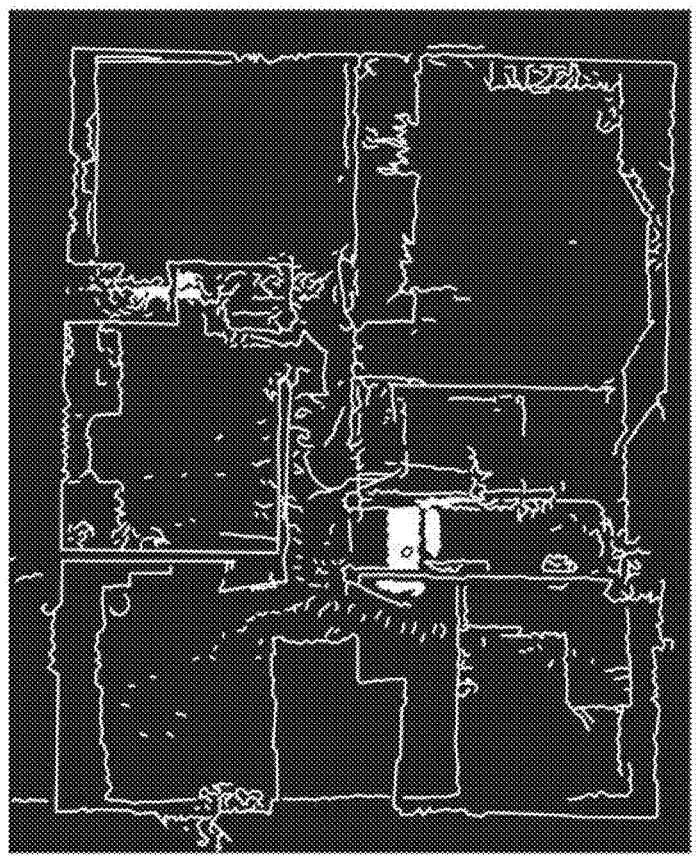
FIGS. 2A-2B illustrate an exemplary and non-limiting embodiment of laser matching.
Figure 2A:
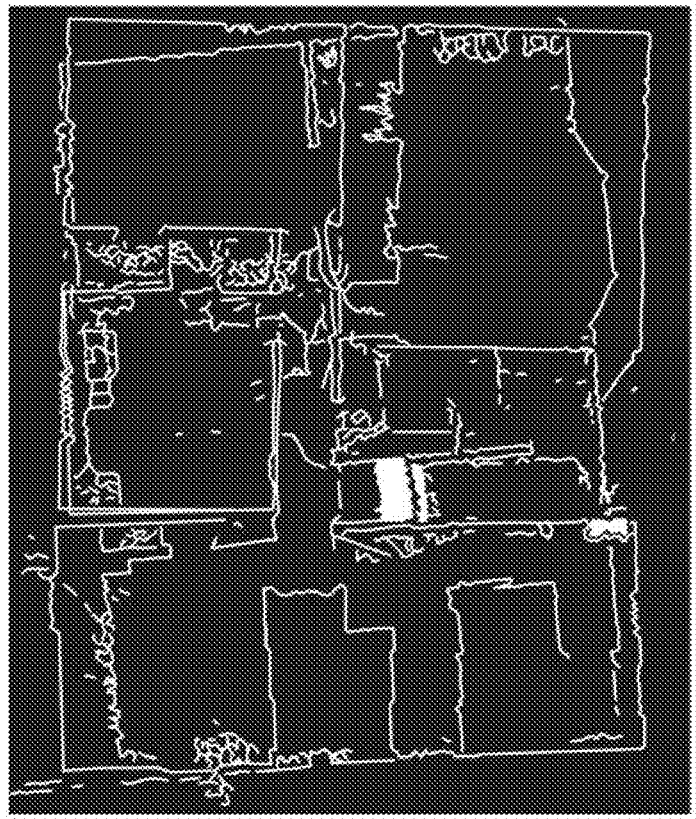

With reference to FIG. 2, there is illustrated an exemplary and non-limiting embodiment of laser matching. In both the left and right image there are illustrated images showing slices taken of a 3D model of two floors of a house forming a plan view. The model shown on the left does not filter points for laser matching and the one on the right does. There is an observable difference in the squareness of the room and the alignment of the two floors relative to each other.

Figure 3A:
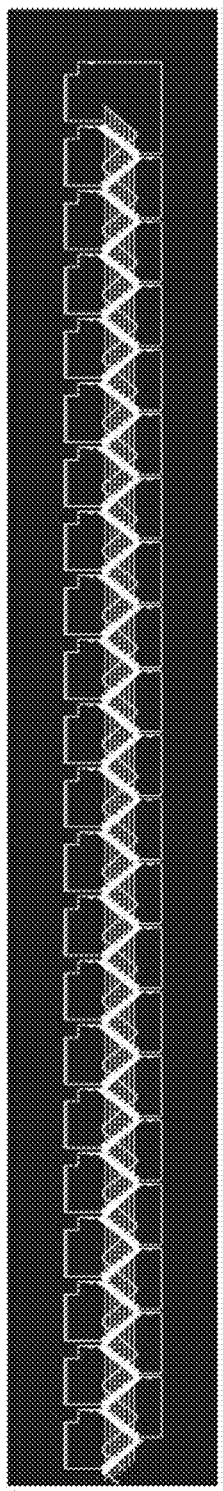
FIGS. 3A-3B illustrate an exemplary and non-limiting embodiment of extending planar surfaces.
Figure 3B:
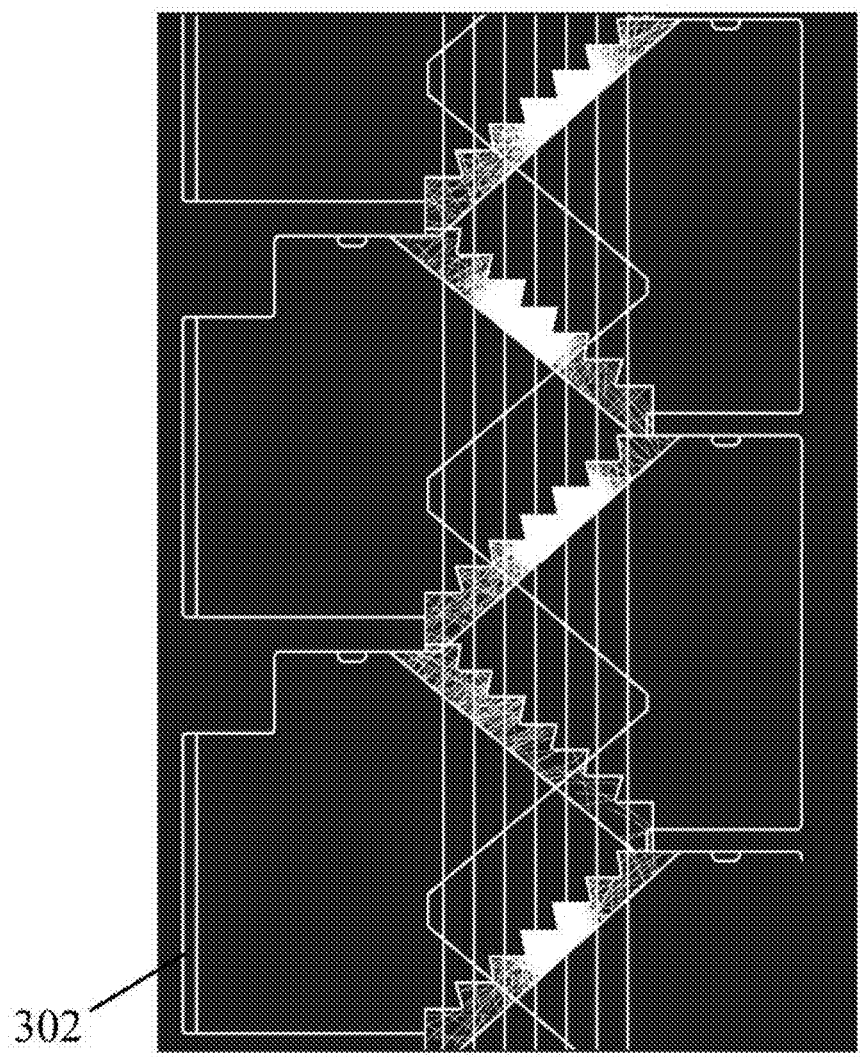

With reference to FIGS. 3A and 3B, there is illustrated an exemplary and non-limiting embodiment of extending planar surfaces. Specifically, there is illustrated extending wall and floor planar surfaces to enable improved mapping of complex environments. As illustrated, the outside walls 302 of a stairwell are extruded up from the first floor as a prior map for matching new data as the user ascends the stairwell. This produces a repeatable stairwell without twists and misalignments that are otherwise common in these challenging environments for scanning.

Plane fitting techniques, such as RANSAC, may be used to extract large planes that are near vertical (e.g., walls) or near horizontal (e.g., floors or ceilings). These planar surfaces may then be temporarily assumed to extend into as yet unmapped regions to help align new data. For example when walking through a doorway, assuming that the floor plane extends tends to prevent pitch or roll errors in the spaces on either side of the doorway. In the case of a long hallway, extending the walls, ceiling and floor can be effective in preventing gradual random drift errors in rotation and hold the hall straight and flat.

The plane of a wall may be extracted mathematically and then boundaries of that plane extended into adjacent regions of a point cloud or map to ensure alignment of a wall via both the vertical and horizontal passing through of walls, floors, and ceilings. In the case of stairwells which require capturing a continuous spiral during ascent or descent, this provides a constraint to ensure alignment between floors. As scanning is extended upwards or downwards, such constraints may ensure alignment between floors of the wall of the stairwell.

In accordance with exemplary and non-limiting embodiments, a SLAM mapping system may in real or near-real time appraise the accuracy of newly acquired data cloud points, assign a confidence metric to each such data point or group of data points reflecting a confidence in spatial accuracy, and react accordingly. In some instances, data cloud points from a scan frame with an assigned confidence metric below a previously determined threshold may be discarded. Acceptance thresholds may be selectively set by the user depending on the environment and the tradeoff between mapping speed and accuracy. In such instances, an operator of the SLAM system may be guided, such as via a user interface forming a part of the SLAM system, to reacquire scan data of a volume in space corresponding to the discarded data points.

In other embodiments, the data points deemed to have a confidence metric below the threshold may be retained and adjusted to attempt to improve confidence of placement. In one embodiment the alignment to map state may be rerun with different parameters or different initial estimates. This may result in a higher confidence match from the optimization by starting at a better guess that escapes an incorrect local minimum and/or reducing errant point to point matches. Different parameters include, but are not limited to, reducing the distance of search for nearby point neighbors to provide a better local match that is less impacted by sparse map data and noise. Different initial guesses may be determined by looking at position and orientation estimates from earlier steps in the localization process, such as inertial or vision based estimates instead of laser odometry, and trying one of those to see if the match may be improved. Alternate embodiments may store the low confidence data and combine it with subsequent point cloud data, as may be acquired from subsequent additional scans of the volume in question. The process of augmenting point cloud data exhibiting an impermissible lack of spatial confidence with additional point cloud data may be utilized to produce point cloud data with a desired and/or acceptable level of spatial confidence. For example, a new section of a point cloud may not match with the map built so far, but a subsequent scan may fill in missing data that "connects" the unplaced scan with the map. This might occur if the scanner moves quickly through a doorway losing confidence in the room to room matching, and then turns around and captures the doorway and room to room transition more accurately, which would allow the early data of the second room to then be matched accurately to the map. The proposed approach described herein specifically rejects low confidence data all together while scanning so that all data considered has a higher statistical probability of being correct. This approach is specifically beneficial in a system with feedback to control the motion of the device and where mapping is the primary goal of the system. This feedback may include notification that the latest data was rejected and instruction to retry scanning that region. Instructions may, for example, be on screen instructions to a human operator, or route planning feedback to a robotic route planner.

This provides clear and immediate feedback that the map is likely to be good or, conversely, that rescanning is required. The provision of feedback in an interactive manner may act to train a human or robotic operator on a scanning technique by immediately providing feedback on acceptance or rejection of data in a challenging environment and allowing immediate re-scanning of the region to generate a better result.

The results of such data removal of problematic data in a scan may reduce the presence of a local discontinuity in the map or, as is the case with batch optimization solutions, a regional warping of the map as the errant data skews everything around that location.

In some embodiments, a mapping process incorporating both mapping and localization proceeds via a sequence of stages. Such a process may begin with estimates from an IMU of the SLAM system providing data indicative of the motion of the SLAM system. Motion data may then be serially augmented with, for example, visual data, laser odometry data and, finally, laser mapping. Each of these steps functions to incrementally change an estimate of where the SLAM system is located and where the new scan frame data is to be merged into existing map data. As discussed above, each of these updates may have a confidence metric associated with it. These measures of confidence may be utilized to reject updates at each step in the process if they're outside of an acceptable and/or defined tolerance.

Data exhibiting unacceptably low confidence metrics may result, for example, when passing through a doorway to a previously unscanned room. In such an instance, the SLAM system operator may observe local discontinuities in the new scan data. The system may operate to discard inaccurate data and inform the user, such as via a user interface, to go through the doorway again. The user may be further guided to repeat the process until data of a sufficient confidence is obtained.

With reference to FIGS. 4a-4d, there is illustrated an exemplary and non-limiting embodiment of a user interface of a SLAM system. As illustrated, a coordinate system icon indicates the current position and orientation of the SLAM system in relation to the previously mapped point cloud. In practice, such system icons may be color coded. As the user traverses the environment, a line 4002 indicating the previous path of the user up to the present moment is maintained and displayed. In the present embodiment, new data is not prevented from being added to the map. If, for example, the user were to walk through a doorway and the system enters a data rejection mode, the visual path indicator will continue to update as the user position icon moves beyond the displayed mapped point data. In short, the user interface will continue showing the user walking outside of the map but the map won't keep growing.

Figure 4A:
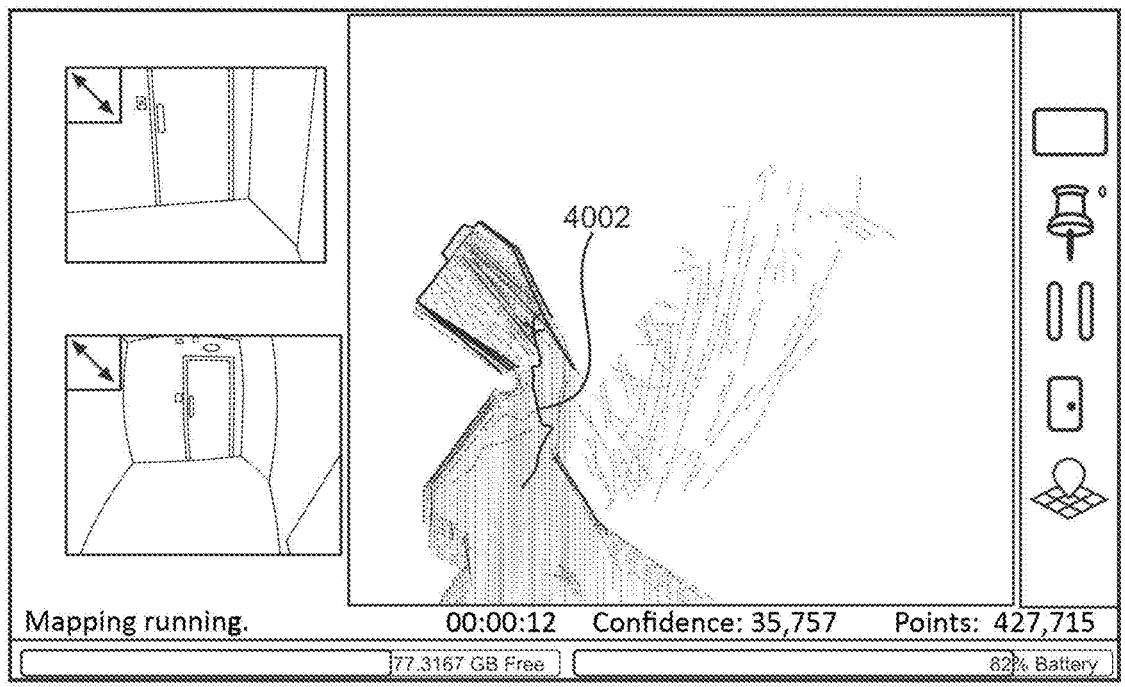
FIGS. 4A-4D illustrate a simultaneous location and mapping (SLAM) system performing mapping according to an exemplary and non-limiting embodiment.
Figure 4B:
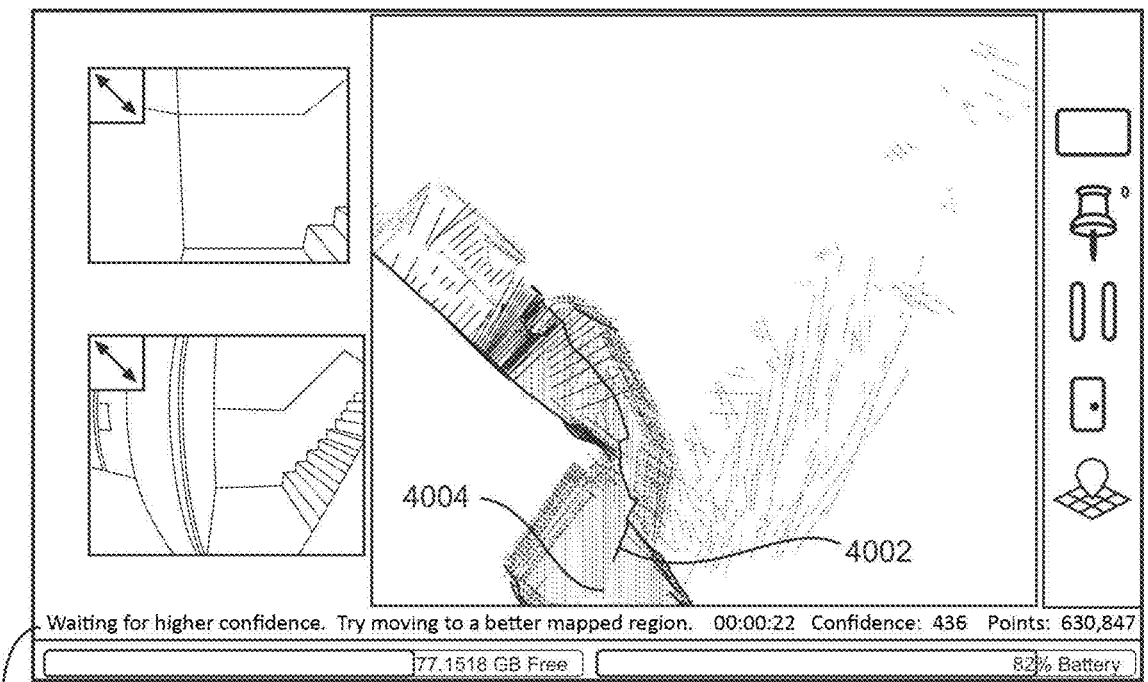
Figure 4C:
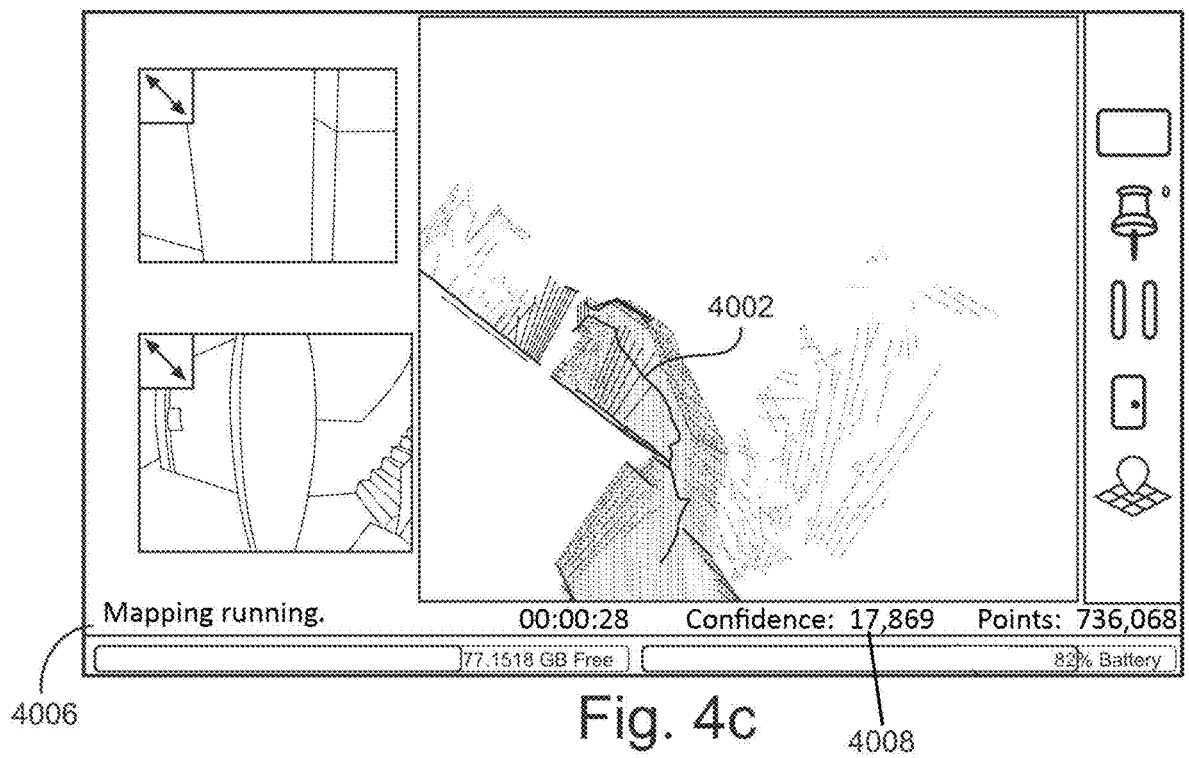
Figure 4D:
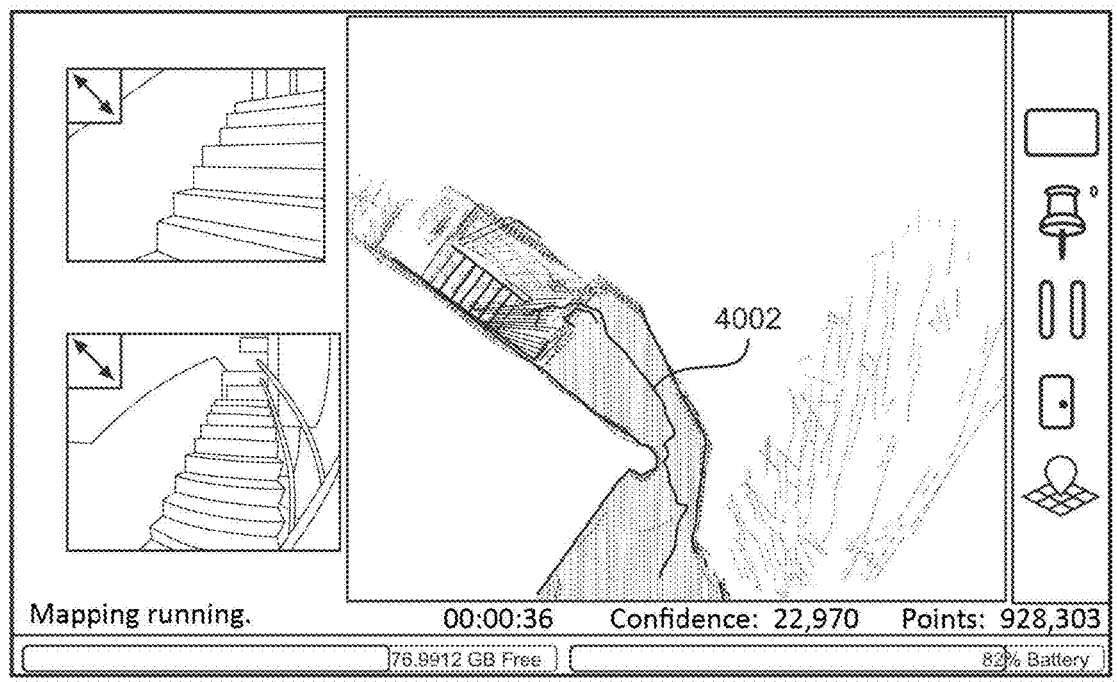

With specific reference to FIG. 4*a*, there is illustrated a user interface of a SLAM system performing mapping while approaching a doorway transition. With reference to FIG. 4*b*, new rejected data 4004 is rejected based on a confidence measure after transitioning through the doorway quickly. A message 4006 to the user displayed on the bottom left indicates the system is waiting for higher confidence, and suggesting to move to a better mapped region. With reference to FIG. 4*c*, after returning and turning around to face the prior map on the other side of the door, new data is acquired and placed within the map with higher confidence and mapping automatically resumes. Note the higher confidence number 4008 in the lower right and the "Mapping running" message 4006 in the lower left. Lastly, with regards to FIG. 4*d*, by slowly walking backwards through the door, mapping confidence stays above the threshold and data is added.

In some embodiments, the system may display a message on the user interface instructing the user to return to a point in the environment and continue scanning. In some embodiments, the system may direct a user to step outside the mapped area and approach the area comprised of rejected data points. In such instances, the system may provide a visual indication of the precise area to be rescanned. In other embodiments, the user interface may display the points having to low a confidence metric in such a way as to alert the user to the general area require a rescan without adding the rejected data points to the map. For example, rejected points may be displayed in, for example, red indicating a problem. In other examples, the rejected points may be displayed as blinking or similar fashion. In other embodiments, information indicative of an unacceptable drop in confidence may be indicated by a variety of modalities including, but not limited to, voice, synthesized voice, sound, vibration and haptic feedback.

As discussed above, in some embodiments the system may buffer low confidence data and accept it either automatically if the operator continues building the map or manually if the operator selects to accept the information anyway. Local batch optimizations may also be performed in some cases to see if new data gathered does enough to improve the original confidence metrics above a predetermined threshold. For example data from three attempted passages through a doorway could be low confidence by themselves, but by combining all of the data and iterating the position of each piece of data, the confidence may improve and result in the buffered data being added to the map.

Metrics for confidence may include, but are not limited to: (1) residual error in a optimization, (2) minimum eigen values in a covariance matrix, (3) number of features tracked for odometry, (4) level of agreement/disagreement between odometry updates, (5) kinematic constraints of the operator/vehicle (maximum speeds or turn rates), and/or (6) a combination of these or other metrics. In one exemplary embodiment, the calculation of the confidence metrics as follows:

a. Confidence metric=(Minimum eigen value)/(Average squared error at the last optimization step)
b. where:
c. Average squared error=(residual squared error)/(Number of points used in the optimization)

With reference to FIG. 5, there is illustrated an exemplary and non-limiting embodiment of a method. First, at step 501, a scanning device acquires a scan frame comprising a point cloud comprising a first plurality of points and describing a spatial characteristic of an environment. Next, at step 503, each of the first plurality of points is attributed with a spatial confidence metric. At step 505, a portion of the first plurality of points is discarded when the spatial confidence metric of at least one of the first plurality of points is below a predefined threshold value. At step 507, a user of the scanning device is directed to acquire a second point cloud approximately coincident with the discarded portion of the first plurality of points.

With reference to FIG. 6, there is illustrated an exemplary and non-limiting embodiment of a method. First, at step 601, a scanning device acquires a scan frame comprising a point cloud comprising a first plurality of points and describing a spatial characteristic of an environment. Next, at step 603, a location estimate of the scanning device is determined via an operation an inertial measurement unit (IMU) forming a part of the scanning device. At step 605, the location estimate is refined via the inclusion of at least one of visual data acquired by the scanning device and laser odometry data acquired by the scanning device wherein each of visual data and odometry data comprises an associated confidence metric. At step 607, the refined location estimate is utilized to discard a portion of the plurality of points from inclusion in the map when the confidence metric is below a predefined threshold.

The use of Simultaneous Localization and Mapping (SLAM) devices in the production of point clouds is described, for example, in PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, which is incorporated herein by reference in its entirety and for all purposes.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "has sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method comprising:
   acquiring with a scanning device a scan frame comprising a point cloud comprising a first plurality of points and describing a spatial characteristic of an environment;
   attributing each of the first plurality of points with a spatial confidence metric, wherein the spatial confidence metric comprises a value for each of the first plurality of points indicating a confidence level in a spatial accuracy of each of the first plurality of points determined location;
   discarding a portion of the first plurality of points when the spatial confidence metric of at least one of the first plurality of points is below a predefined threshold value; and
   directing a user of the scanning device to acquire a second point cloud approximately coincident with the discarded portion of the first plurality of points.

2. The method of claim 1, wherein the predefined threshold is defined by the user.

3. The method of claim 1, wherein the predefined threshold is based, at least in part, upon at least one of an environment in which the scanning devices operates, a mapping speed and a mapping accuracy.

4. The method of claim 1, further comprising providing a notification that the portion was discarded.

5. The method of claim 4, wherein the notification is provided to the user.

6. The method of claim 5, wherein the notification is provided via a user interface forming a part of the scanning device.

7. The method of claim 4, wherein the notification comprises a route planning feedback to a robotic route planner.

8. The method of claim 1, wherein the spatial confidence metric utilizes at least one of surface normal information and data acquisition direction information.

9. A system comprising:
   a laser scanning device comprising at least one processor adapted to execute software that when executed causes the system to:
   acquire with the scanning device a scan frame comprising a point cloud comprising a first plurality of points and describing a spatial characteristic of an environment;
   attribute each of the first plurality of points with a spatial confidence metric, wherein the spatial confidence metric comprises a value for each of the first plurality of points indicating a confidence level in a spatial accuracy of each of the first plurality of points determined location;
   discard a portion of the first plurality of points when the spatial confidence metric of at least one of the first plurality of points is below a predefined threshold value; and
   direct a user of the scanning device to acquire a second point cloud approximately coincident with the discarded portion of the first plurality of points.

10. The system of claim 9, wherein the predefined threshold is defined by the user.

11. The system of claim 9, wherein the predefined threshold is based, at least in part, upon at least one of an environment in which the scanning devices operates, a mapping speed and a mapping accuracy.

12. The system of claim 9, wherein the processor is further adapted to provide a notification that the portion was discarded.

13. The system of claim 12, wherein the notification is provided to the user.

14. The system of claim 13, wherein the notification is provided via a user interface forming a part of the scanning device.

15. The system of claim 12, wherein the notification comprises a route planning feedback to a robotic route planner.

16. A method comprising:
    acquiring with a scanning device a scan frame comprising a point cloud comprising a first plurality of points and describing a spatial characteristic of an environment;
    determining a location estimate of the scanning device via an operation an inertial measurement unit (IMU) forming a part of the scanning device;
    refining the location estimate via the inclusion of at least one of visual data acquired by the scanning device or laser odometry data acquired by the scanning device wherein the at least one of visual data acquired by the scanning device or the laser data acquired by the scanning device each comprises an associated confidence metric, wherein the confidence metric comprises a value for each of the first plurality of points indicating a confidence level in a spatial accuracy of each of the first plurality of points determined location; and
    utilizing the refined location estimate to discard a portion of the plurality of points from inclusion in the map when the confidence metric is below a predefined threshold.

17. The method of claim 16, wherein the predefined threshold is defined by the user.

18. The method of claim 16, wherein the predefined threshold is based, at least in part, upon at least one of an environment in which the scanning devices operates, a mapping speed and a mapping accuracy.

19. The method of claim 16, further comprising providing notification that the portion was discarded.

20. The method of claim 19, wherein the notification is provided to the user.

21. The method of claim 20, wherein the notification is provided via a user interface forming a part of the scanning device.

22. The method of claim 19, wherein the notification comprises a route planning feedback to a robotic route planner.

23. A system comprising:
a laser scanning device comprising at least one processor adapted to execute software that when executed causes the system to:
acquire with a scanning device a scan frame comprising a point cloud comprising a first plurality of points and describing a spatial characteristic of an environment;
determine a location estimate of the scanning device via an operation an inertial measurement unit (IMU) forming a part of the scanning device;
refine the location estimate via the inclusion of at least one of visual data acquired by the scanning device or laser odometry data acquired by the scanning device, wherein the at least one of visual data acquired by the scanning device or the laser data acquired by the scanning device each comprises an associated confidence metric, wherein the confidence metric comprises a value for each of the first plurality of points indicating a confidence level in a spatial accuracy of each of the first plurality of points determined location; and
utilize the refined location estimate to discard a portion of the plurality of points from inclusion in the map when the confidence metric is below a predefined threshold.

24. The system of claim 23, wherein the predefined threshold is defined by the user.

25. The method of claim 23, wherein the predefined threshold is based, at least in part, upon at least one of an environment in which the scanning devices operates, a mapping speed and a mapping accuracy.

26. The method of claim 23, wherein the processor is further adapted to provide notification that the portion was discarded.

27. The method of claim 26, wherein the notification is provided to the user.

28. The method of claim 27, wherein the notification is provided via a user interface forming a part of the scanning device.

29. The method of claim 26, wherein the notification comprises a route planning feedback to a robotic route planner.

* * * * *